United States Patent
Wu

(10) Patent No.: US 7,533,302 B2
(45) Date of Patent: May 12, 2009

(54) TRACE AND DEBUG METHOD AND SYSTEM FOR A PROCESSOR

(75) Inventor: June-Yuh Wu, Renwu Township, Kaohsiung County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 526 days.

(21) Appl. No.: 11/252,755

(22) Filed: Oct. 19, 2005

(65) Prior Publication Data
US 2006/0117224 A1 Jun. 1, 2006

(30) Foreign Application Priority Data
Nov. 15, 2004 (TW) .............................. 93134898 A

(51) Int. Cl.
*G06F 11/00* (2006.01)
(52) U.S. Cl. .................. 714/45; 714/31; 714/34; 712/227
(58) Field of Classification Search .................. 714/31, 714/34, 45; 712/227
See application file for complete search history.

(56) References Cited
U.S. PATENT DOCUMENTS
5,491,793 A * 2/1996 Somasundaram et al. ..... 714/45

| | | | |
|---|---|---|---|
| 6,530,047 B1 * | 3/2003 | Edwards et al. | 714/724 |
| 7,346,476 B2 * | 3/2008 | Levine et al. | 702/187 |
| 2003/0204707 A1 * | 10/2003 | Liang | 712/227 |
| 2006/0129999 A1 * | 6/2006 | Hiraoka et al. | 717/128 |

OTHER PUBLICATIONS

Vranken. "Debug facilities in the TriMedia CPU64 architecture." Test Workshop, Proceedings. May 25-28, 1999.*

* cited by examiner

*Primary Examiner*—Robert Beausoliel
*Assistant Examiner*—Philip Guyton
(74) *Attorney, Agent, or Firm*—Bacon & Thomas, PLLC.

(57) ABSTRACT

A trace and debug method and system for a processor. The method includes the steps: (A) monitoring a program counter (PC); (B) determining if a processor core executes non-successive instruction in accordance with an address data of the program counter; (C) producing a trace break event in order to set the processor core to enter a debug mode if the processor core executes a non-successive instruction; (D) fetching a value of the program counter and a state of the processor core; and (E) sending the value and the state to a host to accordingly form a trace and debug message with respect to the processor core.

2 Claims, 5 Drawing Sheets

```
Start:                                      PC trace:
0x0   li    r3, 0x25                        0x0
0x4   Sll   r7, r3, 0x2                     0x4
0x8   addri r4, r3, 0x10    ;r4 = 53        0x8
0xc   Sub   r7, r7, 0x5     ;r7 = 143       0xc
0x10  Bne   r7, r4, Lab_b   ;r7 != r4, generate branch 0x10   ;(bne)   <= Debug event, Lab_a:
0x14  Lui   r9, 0x1234
0x18  Ori   r9, r9, 0x5678
0x1c  La    r10, Exit_a (0x300)
0x20  Br    r10

Lab_b:
0x24  Lui   r9, 0x8765                      0x24
0x28  Ori   r9, r9, 0x4321                  0x28
0x2c  La    r10, Exit_b (0x400)             0x2c
0x30  Br    r10                             0x30     ;(br)   <= Debug event,
                                                     ;Get current inst. and decide
                                                     ;target address (0x400)
                                                     ;Watch data value (opt.)
0x34  Nop
                                            0x400    ;(exit_b)
```

FIG.6

TRACE AND DEBUG METHOD AND SYSTEM FOR A PROCESSOR

BACKGROUND OF THE INVENTION

1. Field of the Invention

The invention relates to the technique field of trace and debug and, more particularly, to a low-cost trace and debug method and system for a processor.

2. Description of Related Art

With the rapid development of electronic technologies, various processor architectures have accordingly become more complex. Thus, a processor typically has an internal hardware debug module to enable a designer to easily use the processor in developing new systems. FIG. 1 is a block diagram of an internal hardware debug module of a processor. As shown in FIG. 1, a trace monitor 130 monitors the signals on the address bus and the data bus, and stores the signals in a trace buffer 140 for further analysis by the designer. However, such an architecture is suitable for only a processor core without a cache function.

To overcome the aforementioned problem, a MIPS processor uses its embedded circuit to send the variations of a program counter (PC) to an integrated development environment (IDE) software through additional EJTAG (Enhanced Joint Test Action Group) pins. Then, the MIPS processor's internal status can be reconstructed in the IDE software. However, when the quantity of EJTAG pins is not sufficient, the corresponding output information is very little. To parse the little information of the MIPS processor, the IDE software will become quite complicated. In order to simplify the complexity of the IDE software, the MIPS processor needs to be halted until the information is output to the IDE software completely. As such, a real-time PC trace is difficult and the MIPS processor cannot take a data trace.

FIG. 2 is a block diagram of an internal hardware debug module of a typical ARM processor, which uses an embedded trace device to output the traced information of the ARM processor core to an IDE software through its debug pins. Such a way can obtain a real-time trace, but the embedded trace device needs about 17K to 55K gates and additional output pins, which increases the hardware cost. In addition, for a high-speed ARM processor or the limited additional output pins, larger embedded trace buffer is required to have the PC or data trace function.

A typical SH5 processor is built with a debug link and a JTAG interface. In addition, traced information is stored in a DM FIFO (debug module first in first out). The DM FIFO is a 3*64-bit FIFO. Such a way can use less memory, but when the FIFO is filled with data, the processor needs to be halted and new traced data is discarded. The FIFO can be set as a circular FIFO. When the circular FIFO is filled with data, the processor does not need to be halted but new traced data will cover old traced data. Therefore, it is desirable to provide an improved trace and debug method and system to mitigate and/or obviate the aforementioned problems.

SUMMARY OF THE INVENTION

An object of the invention is to provide a low-cost trace and debug method, which can eliminate an internal trace register in the prior art to thus save hardware cost.

Another object of the invention is to provide a low-cost trace and debug method, which can eliminate additional output pins in the prior art to thus save hardware cost.

In accordance with one aspect of the present invention, there is provided a trace and debug method for a processor. The processor includes a processor core, a cache and a timer. The processor core has a normal mode, a debug mode and a program counter (PC) to record a subsequent instruction address. The cache is connected through an address bus and a data bus to the processor core. The timer is connected to the processor core to offer a timer function to an operating system for performing a context switch. The method includes the steps of: (A) monitoring the program counter; (B) determining whether a processor core executes a non-successive instruction in accordance with an address data of the program counter, and if the processor core executes a non-successive instruction, executing steps (C)~(E); (C) generating a trace break event in order to set the processor core from the normal mode to a debug mode; (D) fetching a value of the program counter and a state of the processor core; and (E) sending the value and the state to a host to accordingly form a trace and debug message with respect to the processor core.

In accordance with another aspect of the present invention, there is provided a trace and debug system for a processor. The processor includes a processor core, a cache, a bus interface unit (BIU) and a timer device. The processor core has a normal mode, a debug mode and a program counter (PC) to record a subsequent instruction address. The cache is connected by an address bus and a data bus to the processor core. The BIU is coupled with the cache and a main memory. The timer is connected to the processor core to offer a timer function for an operating system to perform a context switch. The system includes a trace monitor, a hardware break device and a debug controller. The trace monitor is connected to the program counter (PC) in order to monitor address data of the program counter. The hardware break device is connected to the address bus and the data bus in order to produce a hardware break event in accordance with a predetermined hardware break point. The debug controller controls an operation of the trace monitor, wherein the trace monitor determines whether the processor core executes a non-successive instruction in accordance with the address data of the program counter. If the processor core executes the non-successive instruction, the trace monitor produces a trace break event in order to set the processor core from the normal mode to the debug mode and then the hardware break device fetches a value of the program counter and a state of the processor core.

Other objects, advantages, and novel features of the invention will become more apparent from the following detailed description when taken in conjunction with the accompanying drawings.

BRIEF DESCRIPTION OF THE DRAWINGS

FIG. 6 is a schematic graph of an embodiment of FIG. 5 in accordance with the invention.

DETAILED DESCRIPTION OF THE PREFERRED EMBODIMENT

Figure 1:
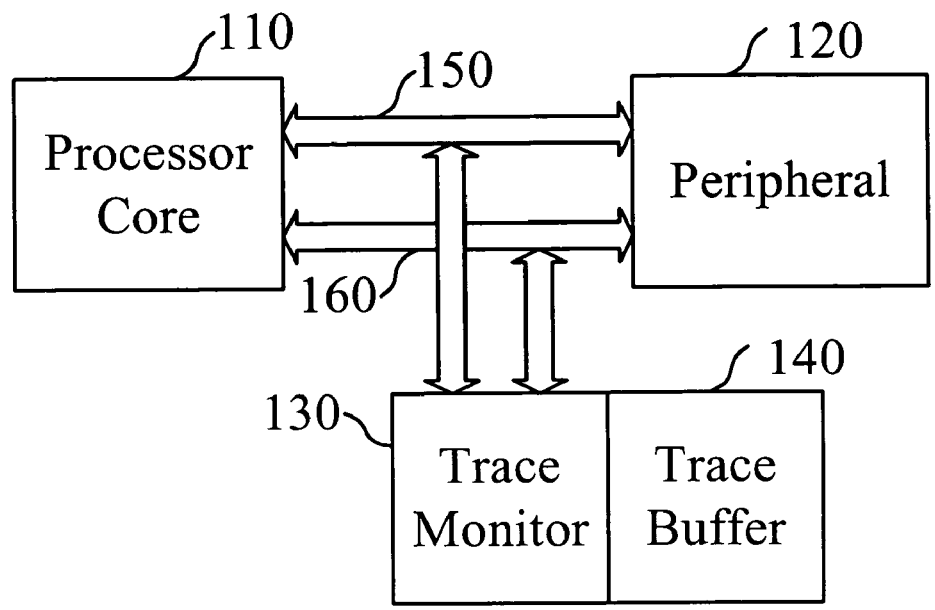
FIG. 1 is a block diagram of an internal hardware debug module of a typical processor.
Figure 2:
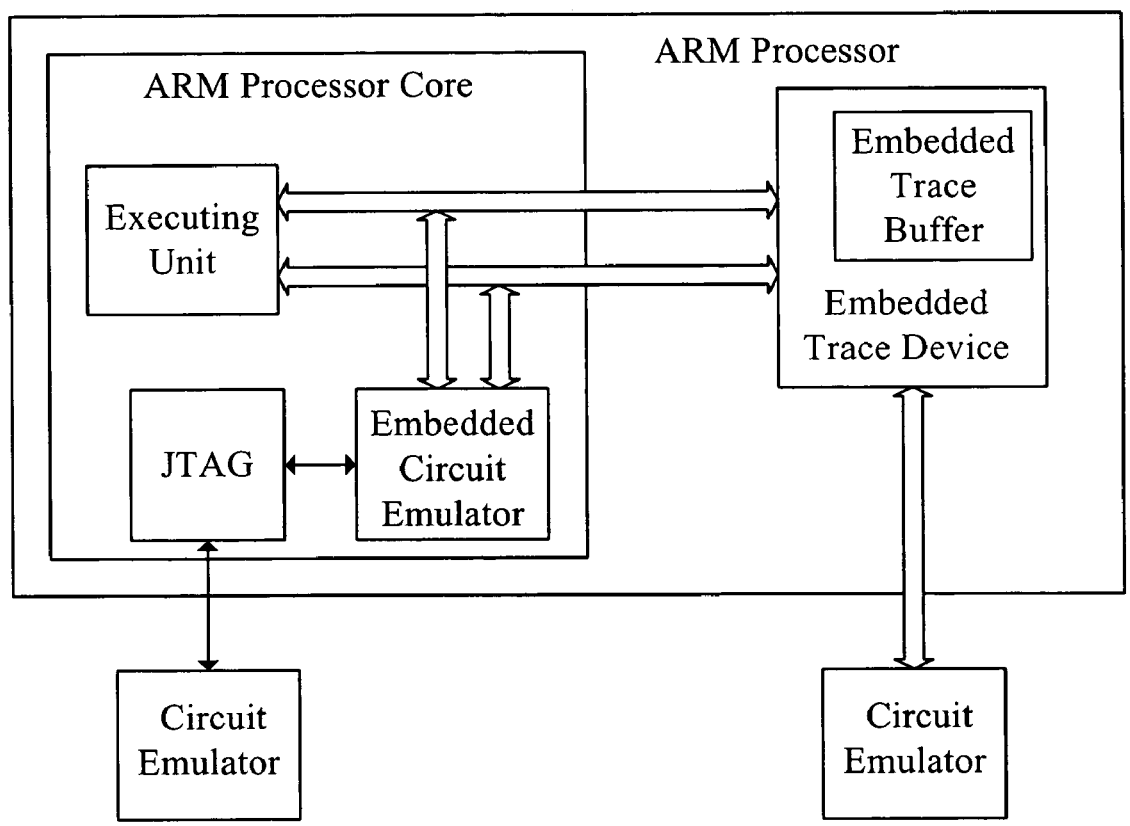
FIG. 2 is a block diagram of an internal hardware debug module of a typical ARM processor.
Figure 3:
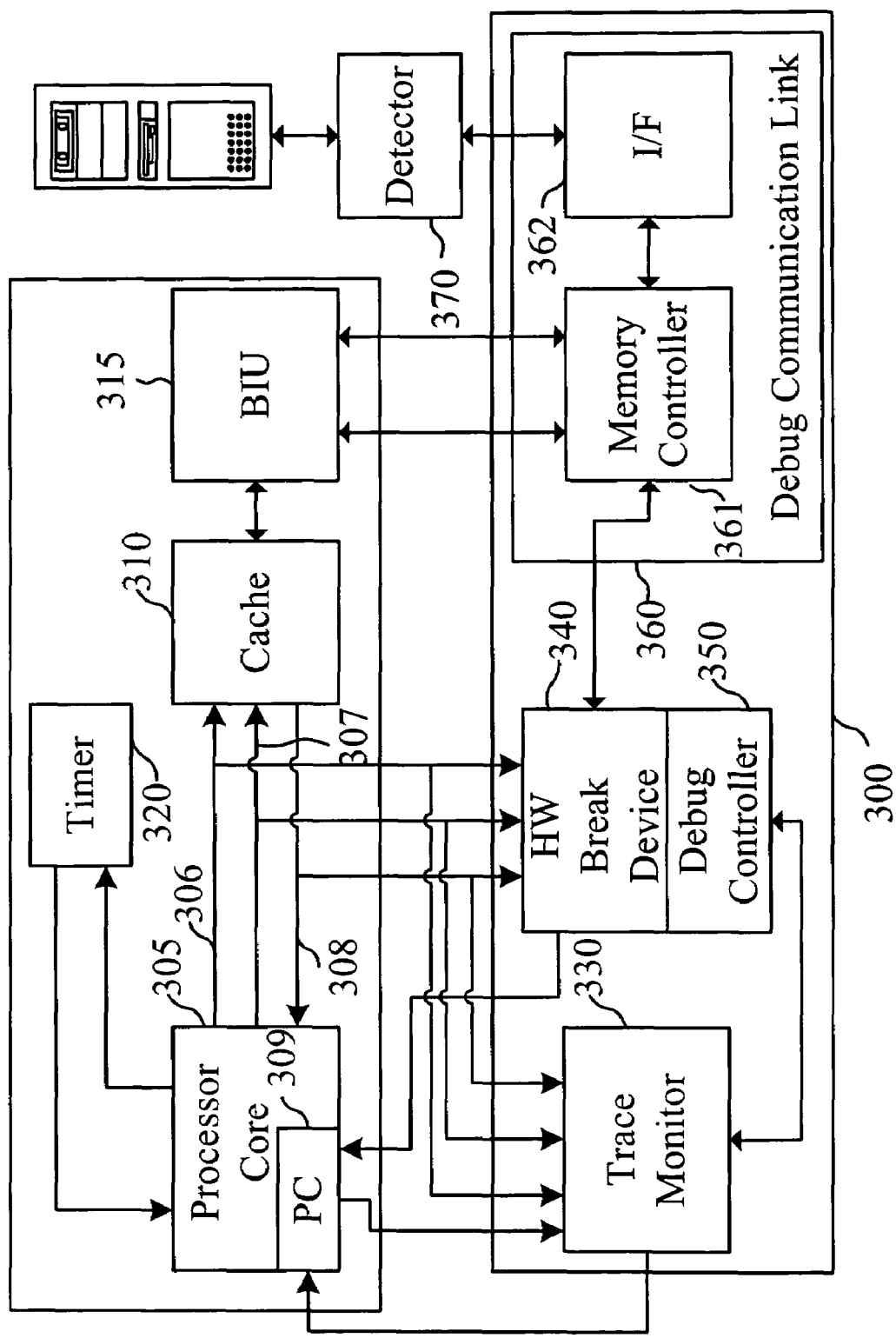
FIG. 3 is a schematic diagram of a low-cost trace and debug system in accordance with the invention.

FIG. 3 is a schematic diagram of a low-cost trace and debug system in accordance with the invention. As shown in FIG. 3, a processor core 305 for executing instructions of a program has a program counter (PC) 309 to record a subsequent instruction address. The processor core 305 has a normal mode and a debug mode. A cache 310 stores instructions and data. The cache 310 is connected to the processor core 305 by an address bus 306, a data-out bus 307 and a data-in bus 308 to thus provide the processor core 305 with required instructions and data for performance, and temporarily store output data written by the processor core 305. A bus interface unit (BIU) 315 is connected to the cache 310 such that when the cache 310 has no data or instruction required by the processor core 305 (cache miss), the cache 310 can read it from a main memory (not shown) through the BIU 315, or when the cache 310 is filled up with data or instructions, a part of data can be written in the main memory (not shown) through the BIU 315. A timer 320 is connected to the processor core 305 to offer a timer function for an operating system to perform a context switch.

The trace and debug system 300 essentially includes a trace monitor 330, a hardware break device 340, a debug controller 350 and a debug communication link 360. The debug communication link 360 is coupled between the hardware break device 340 and a host. When the processor core 305 is in the debug mode, a value of the program counter and a state of the processor core 305 are sent to the host. Accordingly, an integrated development environment (IDE) running on the host can reconstruct the internal status of the processor core 305, thereby forming a trace and debug message with respect to the processor core 305.

The debug communication link 360 includes a memory controller 361 and an interface (I/F) 362. The interface 362 can be a JTAG interface to share original common pins of an existing JTAG circuit, thereby reducing required IC pins. The interface 362 is connected with the host through a detector 370. The detector 370 converts a JTAG interface signal into a receivable signal, such as an RS232 or USB signal, by the host. The interface 362 has one end connected to the memory controller 361 such that data can be sent between the host and the memory controller 361.

The memory controller 361 maps internal registers of both the hardware break device 340 and the debug controller 350 to a memory map of the host for conveniently configuring associated settings. The memory controller 361 is also connected to the BIU 315 such that the host can access the data of main memory (not shown) or peripherals (not shown) connected to the BIU 315.

The hardware break device 340 is connected to the address bus 306, the data-out bus 307 and the data-in bus 308, thereby generating a hardware break event in accordance with a predetermined hardware break point. Thus, the processor core 305 enters the debug mode.

Figure 4:
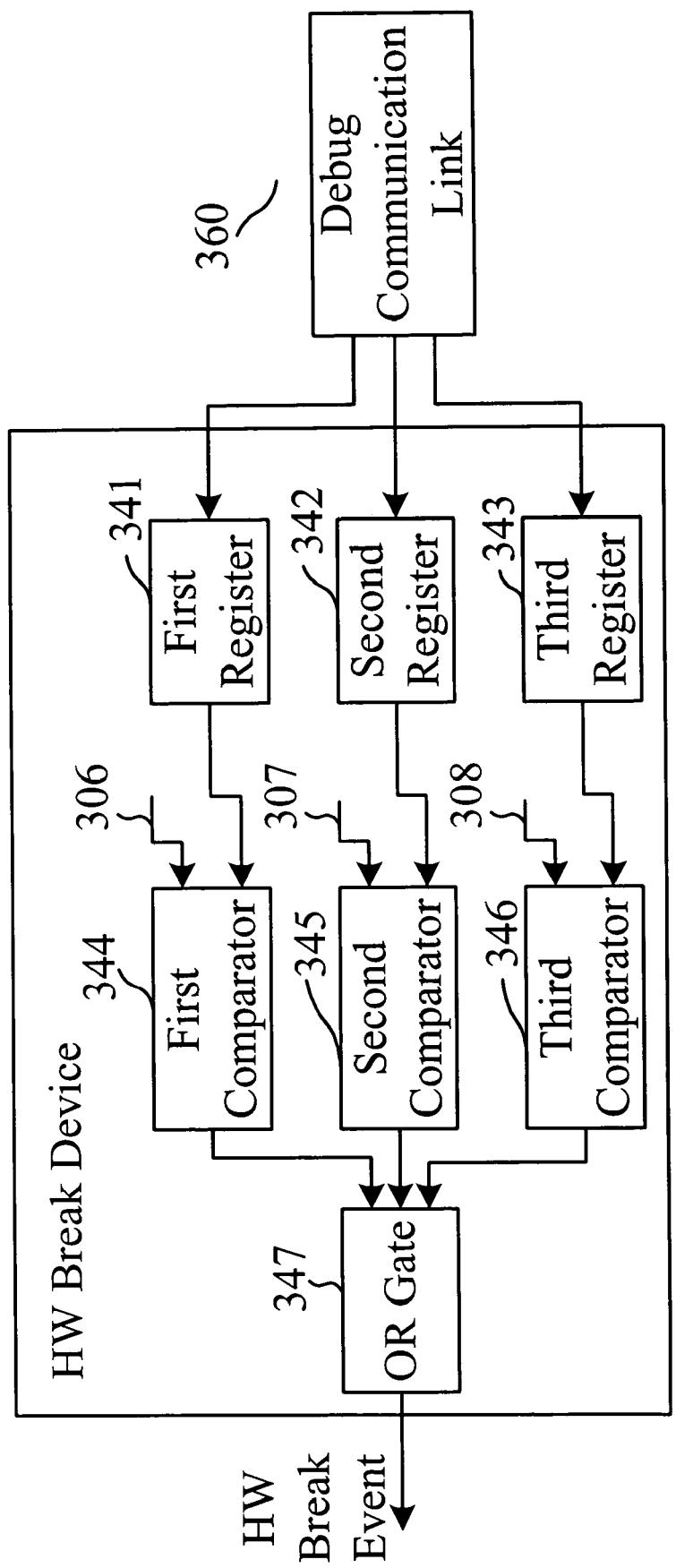
FIG. 4 is a block diagram of a hardware break device in accordance with the invention.

FIG. 4 is a block diagram of the hardware break device 340. As shown, the device 340 includes a first register 341, a second register 342, a third register 343, a first comparator 344, a second comparator 345, a third comparator 346 and an OR gate 347. The host writes an address of break points to be set, a write-out and a read-in data of the processor core 305 respectively to the first, the second and the third registers 341-343 through the debug communication link 360. The first comparator 344 has a first input terminal connected to an output terminal of the first register 341 and a second input terminal connected to the address bus 306. When an address stored in the first register 341 is identical to an address appearing on the address bus 306, the first comparator 344 produces a signal (hardware break event) and sends it to the processor core 305 through the OR gate 347, thereby making the processor core 305 enter the debug mode. In addition, the data-out bus 307, the second register 342 and the second comparator 345 are used to trace write-out data of the processor core 305.

The debug controller 350 is connected to the hardware break device 340 such that the host can set registers of the debug controller 350 through the debug communication link 360 to enable or disable the trace monitor 330.

The trace monitor 330 is connected to the program counter (PC) 309, the address bus 306, the data-out bus 307 and the data-in bus 308, thereby monitoring operations of the PC 309 and the buses. The trace monitor 330 determines if the processor core 305 executes a non-successive instruction in accordance with an address data of the PC 309. If the processor core 305 executes the non-successive instruction, the trace monitor device 330 generates a trace break event and sets the processor core 305 to enter the debug mode. At this point, the hardware break device 340 fetches a value of the PC 309 and a state of the processor core. The timer 320 is disabled as soon as the processor core 305 enters the debug mode, thereby avoiding the timer 320 from continuing counting in the debug mode. Thus, a function of virtual real-time debug is obtained. The hardware break device 340 sends the value of the PC and the state of the processor core 305 to the host such that an integrated development environment (IDE) software on the host can reconstruct the internal status of the processor core 305 to thus form the trace and debug message with respect to the processor core 305. When the processor core 305 enters the debug mode, the host can access data of the main memory (not shown) or peripherals (not shown) connected to the BIU 315 through the memory controller 361 and the BIU 315.

After the value of the PC and the state of the processor core 305 are sent to the host, the hardware break device 340 sets the processor core 305 to return to the normal mode. When the processor core 305 is in the normal mode, the timer 320 is enabled to recommence the program previously executed by the processor core 305.

Figure 5:
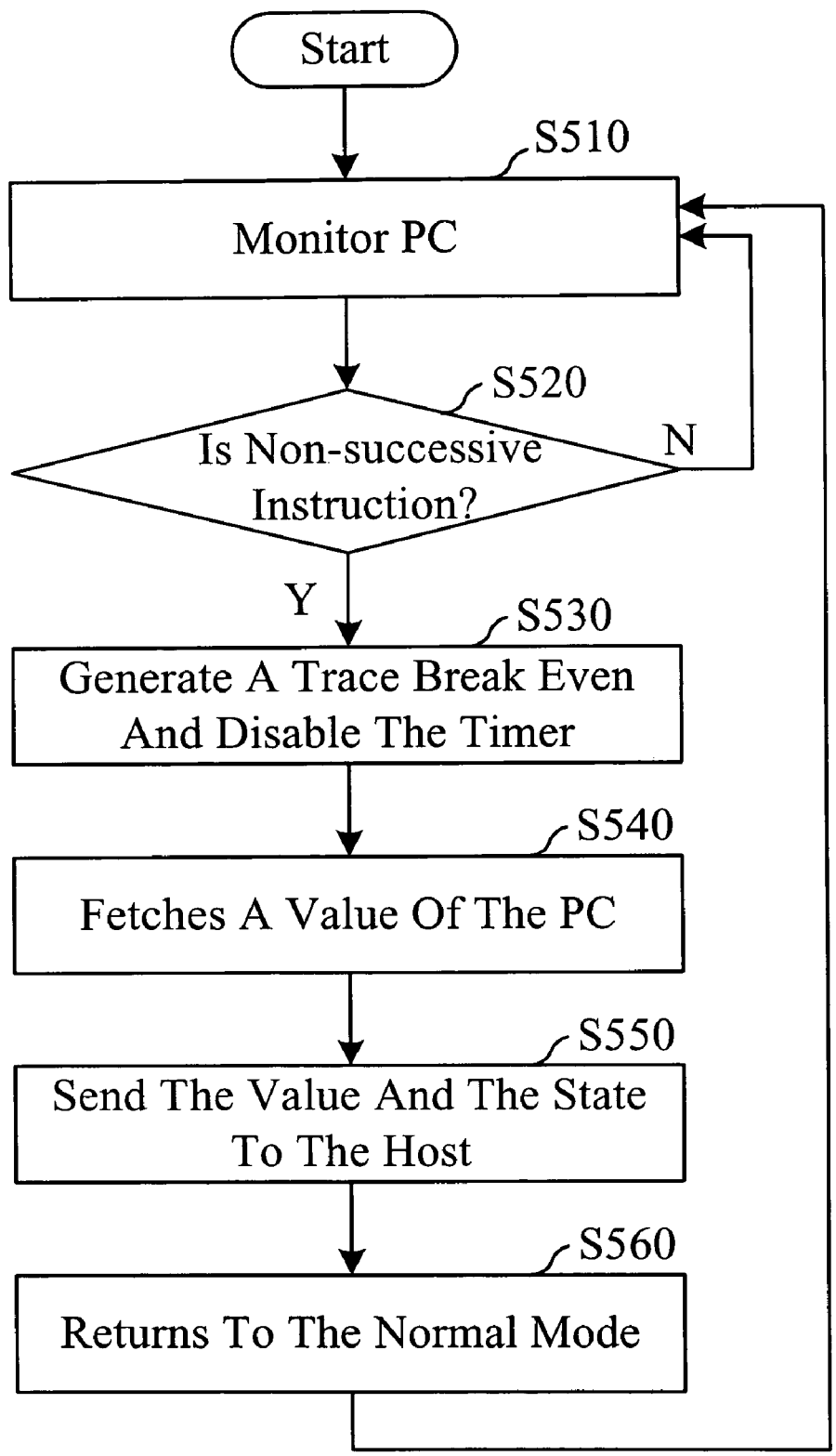
FIG. 5 is a flowchart of a trace and debug method for a processor in accordance with the invention.

FIG. 5 is a flowchart of a trace and debug method for a processor in accordance with the invention. The processor has a processor core 305, a cache 310 and a timing device 320. The processor core 305 has a normal mode, a debug mode and a program counter (PC) 309 to record a subsequent instruction address. The cache 310 is connected to the processor core 305 through an address bus and a data bus. As shown in FIG. 5, step S510 monitors address data of the PC 309. At this point, the processor core 305 is in the normal mode. Step S520 determines if the processor core 305 executes a non-successive instruction in accordance with the address data of the PC 309. If the processor core 305 executes the non-successive instruction, step S530 is executed; otherwise, the procedure returns to step S510.

Step S530 generates a trace break event to set the processor core 305 to enter the debug mode and also disables the timer 320 in order to avoid the timer 320 from continuing counting in the debug mode. Thus, a function of virtual real-time debug is obtained. The timer 320 can provide an operating system with a timer function for performing a context switch. Accordingly, when the timer 320 is disabled, the operating system cannot perform the context switch, thus a program in execution by the processor core 305 is halted and a real-time effect is obtained.

Step S540 fetches a value of the PC 309 and a state of the processor core 305. Step S550 sends the value and the state to the host such that an IDE software running on the host can reconstruct an internal status of the processor core 305 to thus generate a trace and debug message with respect to the processor core 305 for reference and use by a designer.

Step S560 sets the processor core 305 to return to the normal mode. When the processor core 305 returns to the normal mode, the timer 320 is also enabled in order to perform the context switch by the operating system. At this point, the processor core 305 executes an instruction pointed by the PC before entering the debug mode, and then the process returns to step S510.

FIG. 6 is an example in accordance with the invention, which is a schematic view of an assembly program and corresponding comments. As shown in FIG. 6, the right-hand shows a history of contents of the PC 309, which records an address of a subsequent instruction to be executed in the processor core 305. As shown, the instructions at addresses 0x0, 0x4, 0x8, 0xc and 0x10 are successively executed and accordingly the PC 309 has the values of 0x0, 0x4, 0x8, 0xc and 0x10 respectively. Instruction 'Bne r7, r4, Lab_b' represents that a branch to address Lab_b is executed as values of registers r7 and r4, after comparison, are not identical. Accordingly, the Bne operation is executed as register r7 equals to 143 and register r4 equals to 53. In this case, a value of address Lab_b, i.e., 0x24, is stored in the PC 309, and accordingly it is determined that the processor core 305 executes a non-successive instruction. Thus, a trace break event is generated to set the processor core 305 to enter the debug mode. Also, the timer 320 is disabled to avoid continuing counting in the debug mode, thereby obtaining the desired virtual real-time debug function. Next, a value of the PC 309 and a state of the processor core 305 are fetched and sent to the host such that the IDE software running on the host can reconstruct an internal status of the processor core 305 to form a trace debug message with respect to the processor core 305 for reference and use by a designer.

In view of the foregoing, it is known that the invention uses the trace monitor 330 to detect a variation of the PC 309 of the processor core 305 for generating a trace break event, which uses an inherent debug function to obtain the required trace function. In addition, the invention sets the processor core 305 to enter the debug mode for controlling counting of the timer 320, thereby simulating real-time PC trace function. Therefore, because there is no need of the internal trace buffer found in the prior art, the invention can reduce the hardware cost. In addition, instead of having the additional output pins found in the prior art, the invention can use the inherent JTAG pins to obtain a quick trace effect.

Although the present invention has been explained in relation to its preferred embodiment, it is to be understood that many other possible modifications and variations can be made without departing from the spirit and scope of the invention as hereinafter claimed.

What is claimed is:

1. A trace and debug system for a processor, the processor having a processor core, a cache, a bus interface unit (BIU) and a timer, the processor core having a normal mode, a debug mode and a program counter (PC) to record a subsequent instruction address, the cache being coupled to the processor core through an address bus and a data bus, the BIU being coupled with the cache and a main memory, the timer being connected to the processor core to offer a timer function to an operating system for performing a context switch, the system comprising:

a trace monitor, which is connected to the program counter (PC) in order to monitor address data of the program counter;

a hardware break device, which is connected to the address bus and the data bus in order to produce a hardware break event in accordance with a predetermined hardware break point for halting the processor core;

a debug controller, which is connected to the trace monitor in order to control an operation of the trace monitor; and a debug communication link, which is comprised of an interface and a memory controller and coupled between the hardware break device and a host in order to send the value of the PC and the state of the processor core to the host for forming a trace and debug message with respect to the processor core;

wherein the trace monitor determines whether the processor core executes a non-successive instruction in accordance with the address data of the program counter; if the processor core executes the non-successive instruction, the trace monitor generates a trace break event in order to set the processor core from the normal mode to the debug mode and then the hardware break device fetches a value of the program counter (PC) and a state of the processor core; and wherein the interface is connected to the host in order to send and receive data, and the memory controller is connected to the interface, the BIU, and the hardware break device in order to map internal registers of the hardware break device and the debug controller to a memory space of the host, such that the host is capable of conveniently configuring relative settings, and accessing data of the main memory or peripherals connected to the BIU through the memory controller and the BIU.

2. The system as claimed in claim 1, wherein the interface is a JTAG interface.

* * * * *